(12) United States Patent
Beattie, Jr. et al.

(10) Patent No.: US 11,109,339 B2
(45) Date of Patent: Aug. 31, 2021

(54) PRE-PROVISIONED ACCESS MANAGEMENT CONTAINERS FOR WIRELESS SERVICES

(71) Applicant: AT&T Intellectual Property I, L.P., Atlanta, GA (US)

(72) Inventors: James Gordon Beattie, Jr., Bergenfield, NJ (US); Haywood S. Peitzer, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 31 days.

(21) Appl. No.: 16/281,615

(22) Filed: Feb. 21, 2019

(65) Prior Publication Data

US 2020/0275399 A1    Aug. 27, 2020

(51) Int. Cl.
| | |
|---|---|
| H04W 60/04 | (2009.01) |
| H04W 36/26 | (2009.01) |
| H04W 76/50 | (2018.01) |
| H04J 11/00 | (2006.01) |
| H04W 36/32 | (2009.01) |

(52) U.S. Cl.
CPC ......... *H04W 60/04* (2013.01); *H04J 11/0093* (2013.01); *H04W 36/26* (2013.01); *H04W 36/32* (2013.01); *H04W 76/50* (2018.02)

(58) Field of Classification Search
None
See application file for complete search history.

(56) References Cited

U.S. PATENT DOCUMENTS

| | | | |
|---|---|---|---|
| 6,910,078 B1 * | 6/2005 | Raman | H04L 29/06027 709/231 |
| 7,603,697 B1 * | 10/2009 | Kupsh | H04W 12/0401 726/2 |
| 8,700,748 B2 * | 4/2014 | Iwaya | G06F 8/61 709/220 |
| 8,817,712 B2 * | 8/2014 | Shin | H04W 4/00 370/329 |
| 9,509,701 B2 | 11/2016 | Wohlert et al. | |
| 9,743,341 B2 | 8/2017 | Pinheiro et al. | |
| 9,826,378 B2 | 11/2017 | Wang et al. | |
| 9,942,838 B2 | 4/2018 | Kim et al. | |
| 10,021,560 B2 | 7/2018 | Kant et al. | |
| 10,080,098 B1 * | 9/2018 | Edge | H04W 64/00 |
| 10,117,136 B2 | 10/2018 | Xu et al. | |
| 10,123,232 B2 | 11/2018 | Mishra et al. | |
| 2001/0053689 A1 * | 12/2001 | Aoki | H04W 8/183 455/414.1 |

(Continued)

*Primary Examiner* — Andrew C Oh
(74) *Attorney, Agent, or Firm* — Amin, Turocy & Watson, LLP

(57) ABSTRACT

An enhanced provision of pre-provisioned access management containers for wireless services is disclosed. A method can comprise initiating, by a device comprising a processor, a request for a service from a device of networked devices; facilitating, by the device, a search of an evolved packet core network device for permissive service container data based on the request for the service; facilitating, by the device, retrieval of the permissive service container data from the evolved packet core network device, wherein the permissive service container data comprises code associated with the service; and executing, by the device, the code.

20 Claims, 10 Drawing Sheets

(56) References Cited

U.S. PATENT DOCUMENTS

| | | | |
|---|---|---|---|
| 2003/0134623 A1* | 7/2003 | Kanamaru | H04W 8/22 455/414.1 |
| 2005/0080879 A1* | 4/2005 | Kim | H04L 67/34 709/219 |
| 2006/0031197 A1* | 2/2006 | Oral | G06F 16/338 |
| 2007/0088852 A1* | 4/2007 | Levkovitz | H04L 67/04 709/246 |
| 2008/0141244 A1* | 6/2008 | Kelley | G06F 8/61 717/178 |
| 2011/0022686 A1* | 1/2011 | Ding | H04W 8/12 709/219 |
| 2011/0243115 A1* | 10/2011 | Chen | H04L 67/34 370/338 |
| 2013/0070775 A1* | 3/2013 | Qu | H04W 4/08 370/401 |
| 2013/0111057 A1* | 5/2013 | Yoon | H04L 65/4084 709/231 |
| 2013/0152220 A1* | 6/2013 | Zhang | G06F 21/44 726/30 |
| 2013/0237215 A1* | 9/2013 | Vashi | H04W 8/22 455/432.3 |
| 2013/0279335 A1* | 10/2013 | Ahmadi | H04W 28/0205 370/235 |
| 2013/0301529 A1* | 11/2013 | Lindsay | H04N 7/147 370/328 |
| 2013/0310029 A1 | 11/2013 | Edwards | |
| 2014/0134996 A1* | 5/2014 | Barclay | H04W 24/00 455/422.1 |
| 2014/0376378 A1* | 12/2014 | Rubin | H04L 1/0026 370/235 |
| 2015/0148032 A1* | 5/2015 | Rainer | H04W 12/04 455/432.1 |
| 2015/0173111 A1* | 6/2015 | Agarwal | H04W 12/062 370/329 |
| 2015/0271700 A1* | 9/2015 | Lee | H04W 72/1257 370/230 |
| 2016/0057679 A1* | 2/2016 | Werner | H04W 52/04 455/444 |
| 2016/0127565 A1* | 5/2016 | Sharma | H04L 12/1467 455/406 |
| 2016/0128020 A1 | 5/2016 | Agarwal et al. | |
| 2017/0006514 A1 | 1/2017 | Kiss et al. | |
| 2017/0111792 A1* | 4/2017 | Correia Fernandes | H04W 76/12 |
| 2017/0256147 A1* | 9/2017 | Shanahan | G08G 1/096775 |
| 2018/0107468 A1* | 4/2018 | Huang | H04L 29/08 |
| 2018/0262903 A1* | 9/2018 | Ryan | H04W 4/90 |
| 2018/0295498 A1* | 10/2018 | Neal | H04W 8/06 |
| 2018/0302811 A1 | 10/2018 | Bush et al. | |
| 2018/0310150 A1* | 10/2018 | Cuevas Ramirez | H04W 4/60 |
| 2018/0316543 A1* | 11/2018 | Hwang | H04W 12/009 |
| 2018/0359753 A1 | 12/2018 | McInnis et al. | |
| 2019/0228461 A1* | 7/2019 | Domokos | G06Q 30/0613 |
| 2019/0239077 A1* | 8/2019 | Bradley | H04W 12/082 |
| 2019/0342739 A1* | 11/2019 | Shah | G01C 21/3492 |
| 2019/0379551 A1* | 12/2019 | Prasad | H04W 4/06 |
| 2019/0380011 A1* | 12/2019 | Wong | H04W 8/28 |
| 2020/0084614 A1* | 3/2020 | Xu | H04W 76/12 |

\* cited by examiner

PRE-PROVISIONED ACCESS MANAGEMENT CONTAINERS FOR WIRELESS SERVICES

TECHNICAL FIELD

The disclosed subject matter provides pre-provisioned access management containers for wireless services.

BACKGROUND

Presently, a mobile device has to scan its available bands and select with a foreign mobile network operator carrier device for the purpose of obtaining emergency 911 (E911) service. This can limit enhanced E911 services which can require data and/or video feed of a crisis situation, and non-E911 health and welfare traffic from a mobile device user to other users of other mobile devices. Further, the current system can also complicate or inhibit inter mobile network operator carrier user support.

DETAILED DESCRIPTION

Figure 1:
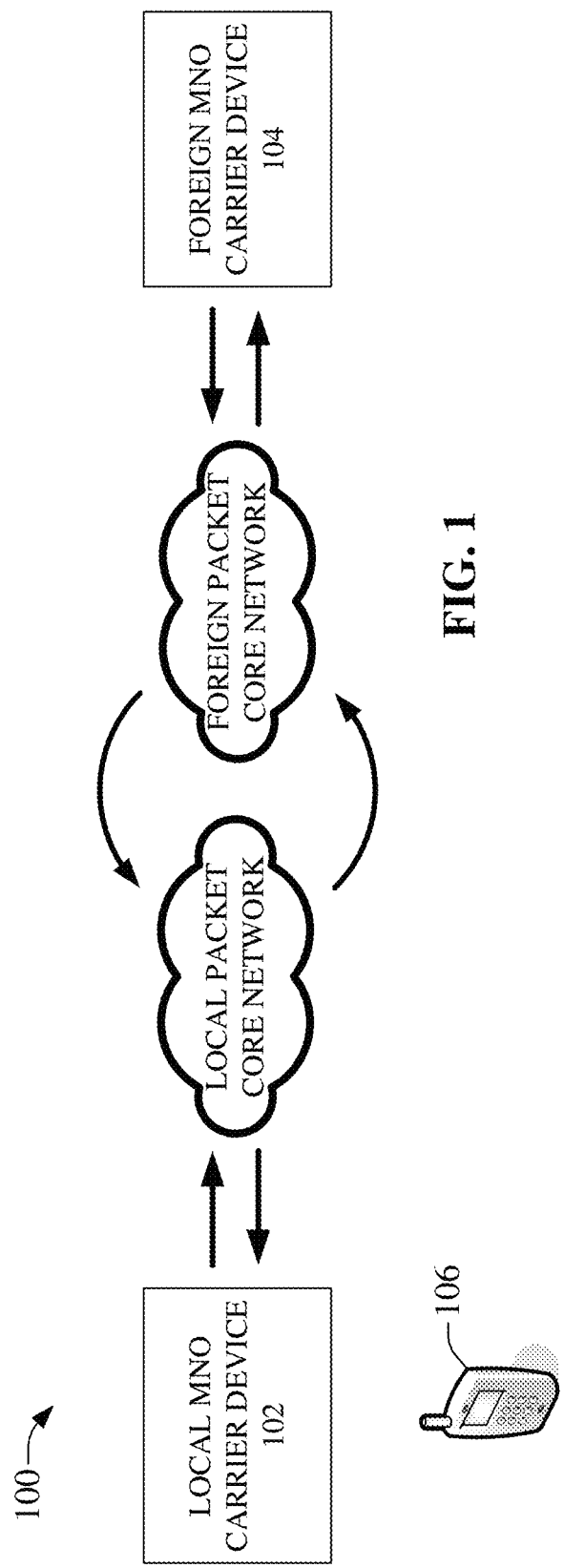
FIG. 1 is an illustration of a system that pre-provisions access management containers for wireless services, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed systems and methods, in accordance with various embodiments, provide a system, apparatus, or device comprising: a processor, and a memory that stores executable instructions that, when executed by the processor, facilitate performance of operations. The operations can comprise receiving event trigger data comprising a request for a service from a user device; initiating a search of a first evolved packet core network device for permissive service container data based on the request for the service; retrieving the permissive service container data from the first evolved packet core network device, wherein the permissive service container data comprises code associated with the service; downloading the permissive service container to the user device; and facilitating execution of the code on the user device.

Further operations can comprise determining, based on the event trigger data, that the user device has transitioned from a second evolved packet core network to a first evolved packet core network, and wherein the search is a first search, initiating, based on the request for the service, a second search of a second evolved packet core network device.

In accordance with further embodiments, the subject disclosure describes a method and/or process, comprising a series of acts that can include: initiating, by a device comprising a processor, a request for a service from a device of networked devices; facilitating, by the device, a search of an evolved packet core network device for permissive service container data based on the request for the service; facilitating, by the device, retrieval of the permissive service container data from the evolved packet core network device, wherein the permissive service container data comprises code associated with the service; and executing, by the device, the code.

Additional acts can comprise initiating, by the device, the request for the service based on a transition by the device from a first evolved packet core network to a second evolved packet core network.

In accordance with the foregoing, the transition from the first evolved packet core network to the second evolved packet core network can be determined based on a location area code; the transition from the first evolved packet core network to the second evolved packet core network can be determined based on a tracking area code; the first evolved packet core network can be associated with a first unique value generated by a first mobile network operator identity, and/or the second evolved packet core network can be associated with a second unique value generated by a second mobile network operator identity.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can include: receiving event trigger data comprising a request for a service from a user device; initiating a search of a first evolved packet core network device for permissive service container data based on the request for the service; retrieving the permissive service container data from the first evolved packet core network device, wherein the permissive service container data comprises code associated with the service; downloading the permissive service container to the user device; and facilitating execution of the code on the user device.

Additional operations can include determining, based on the event trigger data, that the user device has transitioned from a second evolved packet core network to a first evolved packet core network; wherein the search is a first search, initiating, based on the request for the service, a second search of a second evolved packet core network device, wherein the permissive service container data is cached to a second group of evolved packet core network devices.

The subject application details and describes pre-provisioned access management containers for wireless services that can accelerate service to wireless devices, such as smart phones, cellular devices, and the like, in times of emergency and/or at other times, when severe network congestion can be anticipated in regard to non-emergency events, such a live music events, sporting events (e.g., Olympic games, soccer world cup, rugby world cup, . . . ), political rallies, and the like.

The subject application provides and creates permissive service containers that can be rapidly deployed into a packet core network to cover emergencies and/or special events where cooperation between various and/or disparate mobile network operator (MNO) carriers can be advised. In accordance with one or more embodiments, the permissive service containers can be loaded or cached into both local and/or one or more foreign mobile network operators Evolved Packet Core, thereby leveraging concepts such as the open networking automation platform (ONAP)—a platform for real-time, policy-driven orchestration and automation of physical and virtual network functions that enables software, network, information technology, and cloud providers and developers to rapidly automate new services and support complete lifecycle management.

The containers, in one or more embodiments, can be loaded dynamically. In additional and/or alternative embodiments, the containers can remain in a state of stasis, a state of hibernation, or a state of latency, until an event trigger is received or obtained. An event trigger, in accordance with various disclosed embodiments, can be a location area code/tracking area code (LAC/TAC) triggering event, wherein the container can be dynamically downloaded to, or retrieved by, a user equipment device/mobile device in response to the mobile device/user equipment device having been determined to have entered (or exited) a geographic area controlled or maintained by a grouping of cellular networked devices (e.g., a base station of a distributed network of base station devices, an eNodeB device comprising a network of eNodeB devices, an access point device of a cluster of network device, a gNodeB device included in a network of gNodeB devices, etc.) associated with a unique externally generated value(s) denoting an assigned geographic location area or geographic tracking area within a MNO's network. The unique externally generated value can generally be generated by one or more device included in a MNO's Evolved Packet Core network. The event trigger can be one that is mandated by law, regulation, reciprocal arrangement, and/or contract between MNOs, and can be determined from a defined or definable package of essential services and/or streaming of defined or definable media content for a defined or definable period of time. Examples of a package of essential services can include 911 emergency location services, text services (e.g., simple message service (SMS), multimedia message service (MMS), and the like), voice telephonic services (e.g., voice over internet protocol (VoIP), voice over long term evolution (VoLTE), . . . ), streaming of weather warnings by national weather services, streaming of amber alerts, streaming of advisory alerts/messages, . . . .

An advantage for the creation, provision, and/or deployment of permissive service containers into a packet core network to cover emergencies and/or special events, wherein various and/or disparate MMOs can collaborate with one another, is that scarce infrastructure resources can be collectively pooled across a panoply of different MNO associated devices to enhance emergency service coverage and/or optimize content delivery. Additionally, creation, provision, and/or deployment of permissive service containers can better allow individual MNOs to resell services to one another where such resale makes economic and/or practical sense. Further, deployment and/or use of permissive service containers can also be boon to first responder network authority (FirstNet) users, as the distribution and dissemination of the permissive service containers can provide another layer of reliability to the extant FirstNet system that currently uses, in order: a dedicated FirstNet infrastructure, overlaid, when necessary, with a first MNO infrastructure, which in turn can be augmented, when required, with second and third disparate MNO infrastructures.

FirstNet system is a legislated radio network architecture/infrastructure providing a nationwide high-speed broadband wireless network; a single interoperable platform for law enforcement, firefighters, paramedics, and other public safety officials in every state, county, locality and tribal area in the United States of America to use during times of emergency and/or crisis. While the subject disclosure is described in various embodiments in context of the FirstNet system, those having ordinary skill in the art will be cognizant that this disclosure can have a wider applicability than non-emergency situations.

The disclosed and described permissive container concept, in accordance with various embodiments, can extend to service stacks such as shared-use protocol stacks like the internet protocol multimedia subsystem (IMS). Typically for example, VoLTE roaming is disabled for bring your own device (BYOD) scenarios because not all services and/or subsystems included in shared-use protocol stacks necessarily work well in disparate MNO carrier networks. The rationale for shared-use protocol stacks, such as IMS service stacks, not working in identical manners across various MNO carrier networks can be a consequence of disparate and/or divergent implementation of, albeit in full compliance with, the technical standards that outline the entirety of the IMS service stack.

The permissive downloadable container disclosed herein proposes a container for shared-use protocol stacks. Further, respective downloadable containers can also be provided for messaging platforms, secure sockets, special access point networks (APNs) and gateways, etc.

A permissive container in the context of the subject description can be an executable software or data structure (e.g., an abstract data type comprising groupings of key value pairs) comprising a group of functions and/or facilities that can allow seamless inter-MNO connectivity and operability by a user equipment device/mobile device when the user equipment device/mobile device crosses between two disparate MNO carrier networks. Generally, a permissive container can be a package or wrapper around an instance of executable software (such as, a grouping of shared-use protocol services, a group of IMS services (e.g., IMS stack) and/or individual services comprising the group of services—MMS, SMS, VoLTE, . . . ) that includes everything that the executable software requires to execute autonomously, including code, runtime and/or system tools and/or libraries. The executable software can then be executed in a first MNO carrier network and in a second MNO carrier network, wherein the first MNO carrier network is a 'local' MNO carrier network environment with regard to a user equipment device/mobile device, and the second MNO carrier network is a 'foreign' MNO carrier network environment in the context of the user equipment device/mobile device.

The result of executing the executable software on a first device associated with the first MNO carrier network and executing the executable software on a second device associated with the second MNO carrier network should substantially be the same or similar, so that a user of a mobile device/user device transitioning between the first MNO carrier network (e.g., the local MNO carrier network) and the second MNO carrier network (e.g., the foreign MNO carrier network) should be unable to perceive the difference between utilizing a service of a group of services associated with the executable software executing on the first MNO carrier network, and utilizing the service of the group of services associated with the executable software executing on the second MNO carrier network.

Now with reference to the Figures, FIG. 1 illustrates a system 100 that provides pre-provisioned access management containers for wireless services. System 100 can include local MNO carrier device 102 that can be in communication with a local packet core network (e.g., Evolved Packet Core) and a user equipment device 106 that can be associated with the local MNO carrier network (e.g., user equipment device 106 is a member of, and associated with, the local packet core network controlled by a MNO carrier). Local MNO carrier device 102 can also be in reciprocal communication, via a foreign packet core network, with a foreign MNO carrier device 104. It will be understood by those skilled in the art that the term "local MNO" can refer to a first MNO and the term "foreign MNO" can refer to a second MNO, wherein the first MNO and the second MNO refer to disparate commercial telecommunication identities/operators/organizations.

Local MNO carrier device 102 in accordance with various embodiments can create, generate, disseminate, and/or cache permissive service containers into the local packet core network as well as the foreign packet core network. The permissive service containers can leverage concepts comprising ONAP. The permissive service containers can also be loaded dynamically to either the local packet core network and/or the foreign packet core network.

In accordance with one or more embodiments, the permissive service containers can remain in a state of stasis, a static state, a state of hibernation, and/or a state of latency in the evolved packet core (e.g., local evolved packet core and/or foreign packet core) until an event trigger is received or obtained from a user device (e.g., user equipment device 106) by a local MNO carrier device (e.g., local MNO carrier device 102). The event trigger can, for example, be a location area code/tracking area code (LAC/TAC) event, wherein the permissive service containers can be dynamically downloaded from, or retrieve by, user equipment device 106 in response to user equipment device 106 having been determined to have entered (or exited) a defined geographical area controlled and/or maintained by a device or grouping of devices comprising a distributed network of devices (e.g., local MNO carrier device 102).

Generally, the defined geographical area controlled and/or maintained by a device or grouping of devices comprising the distributed network of devices can be assigned and associated with a unique externally generated value denoting the defined geographical area. With reference to the situation depicted in FIG. 1, since user equipment device 106 is associated with local MNO carrier device 102 (e.g., user equipment device 106 and local MNO carrier device 102 are affiliated with a common carrier network), there is typically no need for user equipment device 106 to initiate a download of the permissive service containers from the packet core network (e.g., either local packet core network and/or foreign packet core network) because there should be no discernible distinction in regard to operation of the shared-use protocol stack on user equipment device 106 and/or local MNO carrier device 102.

The event trigger can be one that is mandated by law, regulation, reciprocal arrangement between disparate MNOs, and/or contract between a collection of MNOs. The event trigger, in accordance with various embodiments, can be determined from a package of essential services and/or the streaming of media content for a defined or definable period of time. As noted earlier, examples of a package of essential services can include 911 emergency location services, text services, voice telephonic services, streaming of weather warnings by national weather authorities, streaming of amber alerts, and/or streaming of advisory alerts/messages.

Figure 2:
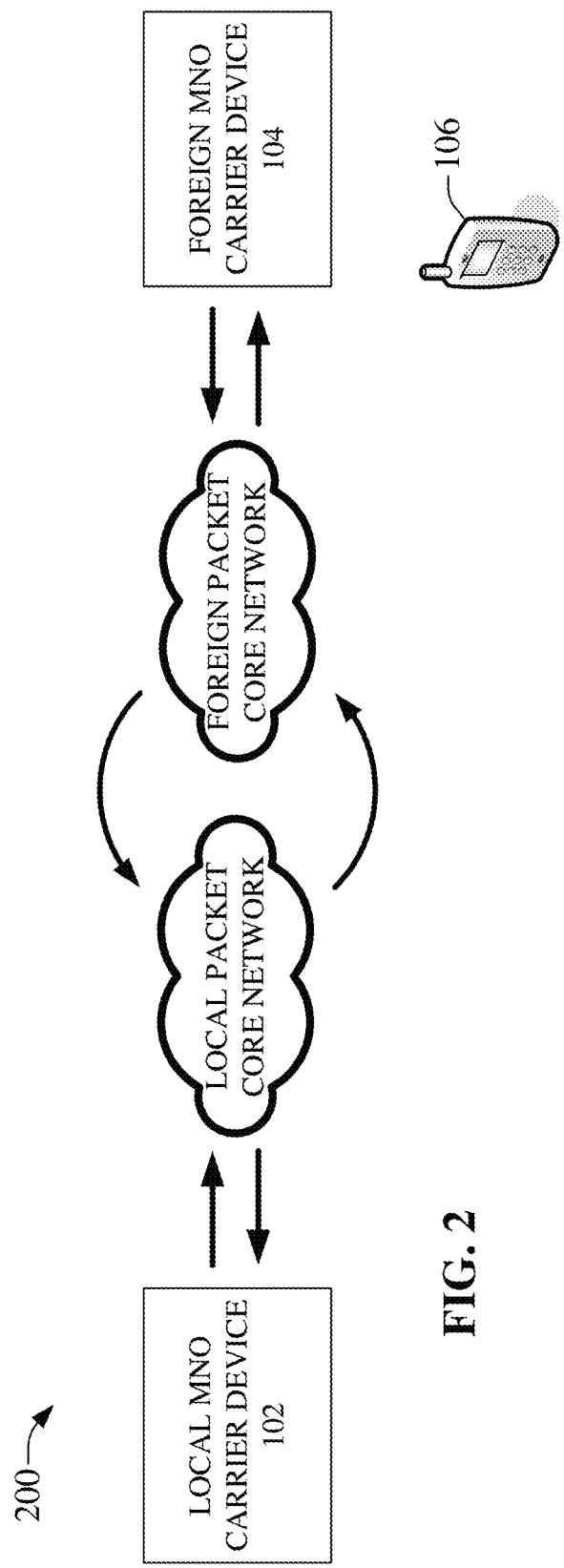
FIG. 2 is a further depiction of a system that pre-provisions access management containers for wireless services, in accordance with aspects of the subject disclosure.

With reference to FIG. 2, illustrated therein is system 100, now referenced as system 200, that provides pre-provisioned access management containers for wireless services. System 200 can include foreign MNO carrier device 104 that can be in operable communication with a foreign packet core network (e.g., Evolved Packet Core) and a user equipment device 106 that can be associated with a local MNO carrier network (e.g., user equipment device 106 is a member of, and associated with, the local packet core network controlled by a MNO carrier) but now is in communication with foreign MNO carrier device 104. Additionally, as depicted, foreign MNO carrier device 104 can also be in reciprocal communication, via foreign packet core network and/or local packet core network, with a local MNO carrier device 102.

As illustrated in the depicted instance, user equipment device 106 can be served by foreign MNO carrier device 104, wherein foreign MNO carrier device 104 provides the IMS stack services to user equipment device 106. However, due to differences of implementation of the shared-use protocol stack by the foreign MNO carrier device 104 with respect to local MNO carrier device 102, the facilities and/or functionalities associated with the shared-use protocol stack as implemented by local MNO carrier device 102 and foreign MNO carrier device 104, for use by mobile device 106, can differ markedly.

Thus, in order to overcome the differences between the facilities and/or functionalities of IMS stack implementations provided by local MNO carrier device 102 and foreign MNO carrier device 104, in accordance with one or more embodiments, foreign MNO carrier device 104, in response to detecting that user equipment device 106 is not associated with the foreign packet core network based, for example, on a triggering event, such as a change in LAC/TAC from using functions and/or facilities associated with local MNO carrier device 102 and the local packet core network to foreign MNO carrier device 104 and the foreign packet core network, can determine whether there are any pertinent permissive service containers (previously persisted to foreign packet core network by local MNO carrier device 102) in the packet core network associated with foreign MNO carrier device 104. In response to determining that there are pertinent and previously cached permissive service containers (for use by devices associated with the packet core supported by local MNO carrier device 102) in the packet core network associated with foreign MNO carrier device 104, foreign MNO carrier device 104 can facilitate the downloading of these pertinent permissive service container to user equipment device 106.

In accordance with various additional and/or alternative embodiments, if foreign MNO carrier device 104, in response to detecting that user equipment device 106 is not associated with the foreign packet core network, and determining that there are no pertinent permissive service containers cached to the packet core network associated with foreign MNO carrier device 104, foreign MNO carrier device 104 can facilitate a search of the packet core network associated with local MNO carrier device 102 to ascertain whether there are extant pertinent and previously cached permissive service containers in the packet core network associated with local MNO carrier device 102. Foreign MNO carrier device 104, in response to determining that the local packet core network associated with local MNO carrier device 102 includes extant previously cached permissive service containers, can facilitate transfer of the pertinent permissive service container from the packet core associated with local MNO carrier device 102 to the packet core associated with foreign MNO carrier device 104 and thereafter facilitate the downloading of these pertinent permissive service container to user equipment device 106. On receiving the permissive service container, user equipment device 106 can execute code included in the permissive service container to provide the functionalities and/or facilities associated with the shared-use protocol stack as implemented for devices (e.g., user equipment device 106) that are native to the packet core associated with local MNO carrier device 102.

In accordance with yet further embodiments, alternative and/or additional, where foreign MNO carrier device 104, in response to: detecting that user equipment device 106 is not associated with the foreign packet core network; determining that there are no pertinent permissive service containers cached to the packet core network associated with foreign MNO carrier device 104; and facilitating a search of the packet core network associated with local MNO carrier device 102 and determining that there are no extant pertinent and previously cached permissive service containers in the packet core network associated with local MNO carrier device 102, foreign MNO carrier device 104 can facilitate local MNO carrier device 102 to initiate creation, generation, and/or distribution/caching (e.g., to the packet core network associated with local MNO carrier device 102 and/or to the packet core network associated with foreign MNO carrier device 104) of the permissive service containers. Once the permissive service containers have been created, generated, and/or distributed/cached to the packet core network(s) (e.g., packet core network associated with local MNO carrier device 102 and/or packet core network associated with foreign MNO carrier device 104), foreign MNO carrier device 104 can facilitate the downloading of the pertinent permissive service container to user equipment device 106, whereupon on obtaining the permissive service container, user equipment device 106 can execute code included in the permissive service container to provide the functionalities and/or facilities associated with the shared-use protocol stack as implemented for devices (e.g., user equipment device 106) that are native to the packet core associated with local MNO carrier device 102.

Figure 3:
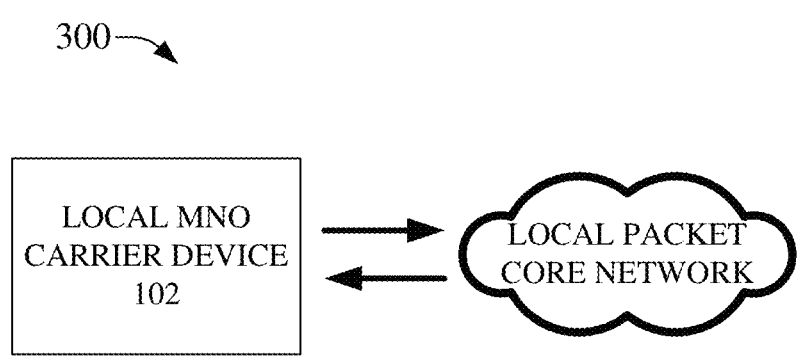
FIG. 3 provides illustration of an additional system that pre-provisions access management containers for wireless services, in accordance with aspects of the subject disclosure.

FIG. 3 illustrates system 100, now referred to as system 300, for providing pre-provisioned access management containers for wireless services. System 300 can include local MNO carrier device 102 that can be in communication with local packet core network (e.g., Evolved Packet Core). Local MNO carrier device 102, in accordance with various embodiments, can create, generate, disseminate, and/or cache permissive service containers into the local packet core network. As noted earlier, the permissive service containers can be loaded dynamically into the local packet core network and/or into a foreign packet core network (not shown).

In accordance with various embodiments, once local MNO carrier device 102 has created, generated, disseminated, and/or cached the permissive service containers, the permissive service containers can remain in a state of stasis, a state of hibernation, and/or a state of latency within the local packet core network and/or in the foreign packet core network until such time as they are required by user devices associated with either local packet core network and/or the foreign packet core network.

Figure 4:
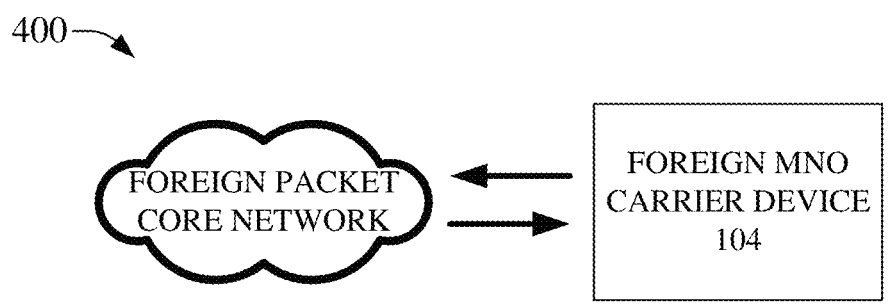
FIG. 4 provides another illustration of a system that pre-provisions access management containers for wireless services, in accordance with aspects of the subject disclosure.

FIG. 4 depicts system 100, now referred to as system 400, for the provision of pre-provisioned access management containers for wireless services. System 400 can include foreign MNO carrier device 104 that can be in communication with foreign packet core network (e.g., Evolved Packet Core). Foreign MNO carrier device 104, in accordance with various embodiments, can determine, based on one or more triggering event such as a change in LAC/TAC, whether or not a user device (e.g., user equipment device 106) is not affiliated with aspects of the foreign packet core network. Further foreign MNO carrier device 104 can also determine whether or not there are any permissive services containers (previously persisted to the foreign packet core network by local MNO carrier device 102) in the packet core network associated with foreign MNO carrier device 104. In response to determining that there are pertinent and previously cached permissive service containers in the packet core network associated with foreign MNO carrier device 104, foreign MNO carrier device 104 can facilitate downloading of these pertinent permissive service containers to the user device.

In accordance with additional and/or alternative embodiments, should foreign MNO carrier device 104, in response to detecting that a user device is not associated with the foreign packet core network, and further determining that there are no pertinent permissive service containers cached to the packet core network associated with foreign MNO carrier device 104, foreign MNO carrier device 104 can facilitate a search of the packet core network associated with local MNO carrier device 102 to ascertain whether or not there are pertinent and previously cached permissive service containers in the packet core network associated with local MNO carrier device 102. Foreign MNO carrier device 104, in response to determining that the packet core network associated with local MNO carrier device 102 includes extant previously cached permissive service containers, can facilitate transfer of the pertinent permissive service containers from the packet core network associated with local MNO carrier device 102 to the packet core network associated with foreign carrier device 104, and thereafter can facilitate the downloading of these pertinent permissive service containers to the user device. On receiving the permissive service containers, the user device can execute code included in the permissive service condensers to provide the functionalities and/or facilities associated with one or more service included in the shared-use protocol stack as implemented for devices that are native to, or affiliated with, the packet core network associated with local MNO carrier device 102.

In accordance with additional varied embodiments, where foreign MNO carrier device 104, in response to: detecting that a user device is not associated or affiliated with the foreign packet core network; determining that there are no pertinent permissive service container cached to the packet core network associated with foreign MNO carrier device 104; and subsequent to facilitating a search of the packet core network associated with local MNO carrier device 102 and determining that there are no extant pertinent and previously cached permissive service containers in the packet core network associated with local MNO carrier device 102, foreign MNO carrier device 104 can facilitate local MNO carrier device 102 to initiate creation, generation, and/or distribution/caching of the permissive service containers to the packet core network associated with local MNO carrier device 102 and/or to the packet core network associated with foreign MNO carrier device 104.

Once the permissive service containers have been created, generated, and/or cached to the packet core network(s), foreign MNO carrier device 104 can facilitate the downloading of the pertinent permissive service containers to the user device, whereupon on obtaining the permissive service containers, the user device can execute code included in the permissive service containers to provide one or more functionality and/or facility associated with services included in the shared-use protocol stack, as the shared-use protocol stack has been implemented for devices that are affiliated with the packet core network associated with local MNO carrier device 102.

Figure 5:
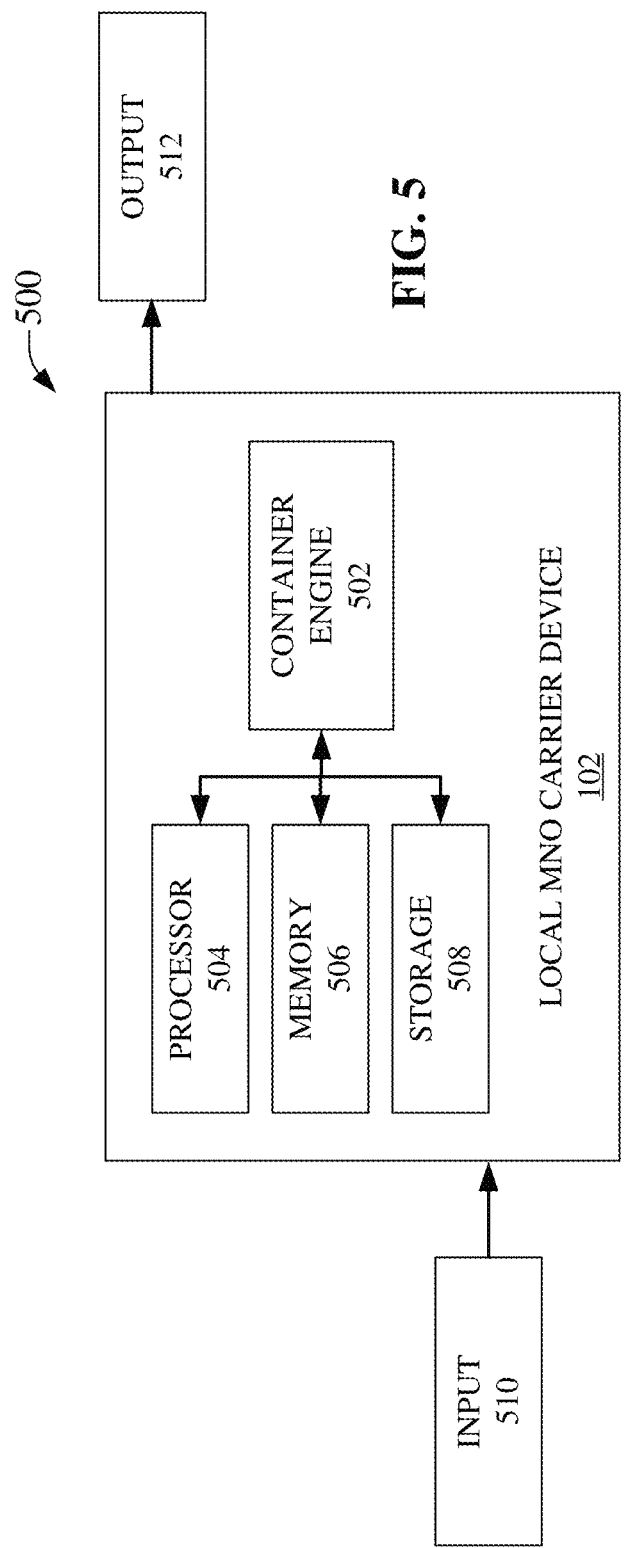
FIG. 5 illustrates another depiction of a system that pre-provisions access management containers for wireless services, in accordance with aspects of the subject disclosure.

FIG. 5 provides further depiction of local MNO carrier device 102, now labeled as system 500, for providing pre-provisioned access management containers for wireless services. Local MNO carrier device 102 can include container engine 502 that can be coupled to processor 504, memory 506, and storage 508. Container engine 502 can be in communication with processor 504 for facilitating operation of computer or machine executable instructions and/or components by container engine 502, memory 506 for storing data and/or the computer or machine executable instructions and/or components, and storage 508 for providing longer term storage of data and/or machine and/or computer readable instructions. Additionally, local MNO carrier device 102 can receive input 510 for use, manipulation, and/or transformation by container engine 502 to produce one or more useful, concrete, and tangible result, and/or transform one or more articles to different states or things. Further, local MNO carrier device 102 can generate and output the useful, concrete, and tangible results and/or the transformed one or more articles produced by container engine 502 as output 512.

Container engine 502 at the instigation, for example, of foreign MNO carrier device 104, can initiate creation, generation, and/or distribution/caching of the permissive service containers to both the packet core network associated with local MNO carrier device 102 as well as to the packet core network associated with foreign MNO carrier device 104. The permissive service containers, after being propagated and cached to the packet core networks associated with local MNO carrier device 102 and/or foreign MNO carrier device 104, can thereafter be used by one or more user devices that are not currently operating within their native local packet core network (e.g., the user device is being operated in a non-native foreign packet core network) to execute code included in the permissive service containers to provide one or more functionality and/or facility associated with services included in an shared-use protocol stack as if the shared-use protocol stack had been implemented for devices that are affiliated with their home packet core network.

Figure 6:
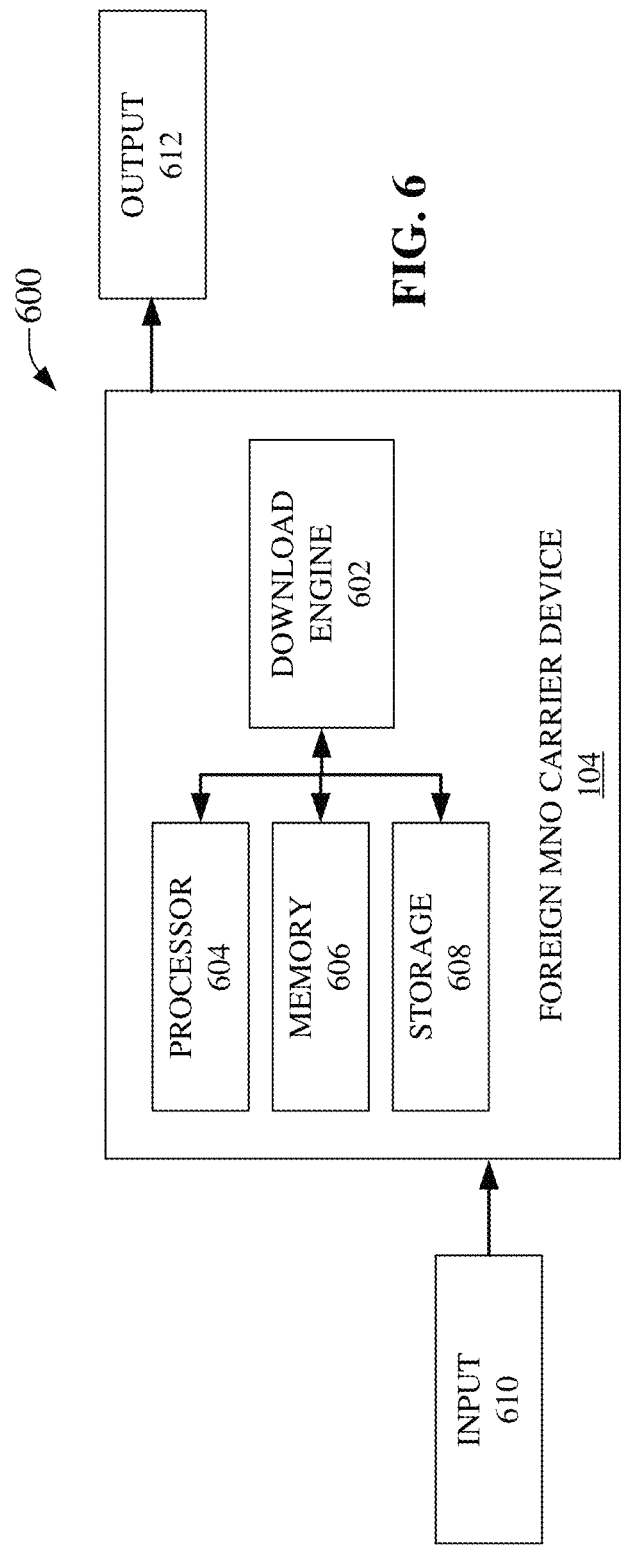
FIG. 6 depicts a further system that pre-provisions access management containers for wireless services, in accordance with aspects of the subject disclosure.

FIG. 6 illustrates foreign MNO carrier device 104, now labeled as system 600, for providing pre-provisioned access management containers for wireless services. Foreign MNO carrier device 104 can include download engine 602 that can be coupled to processor 604, memory 606, and storage 608. Download engine 602 can be in communication with processor 604 for facilitating operation of computer or machine executable instructions and/or components by download engine 602, memory 606 for storing data and/or the computer or machine executable instructions and/or components, and storage 608 for providing longer term storage of data and/or machine and/or computer readable instructions. Additionally, foreign MNO carrier device 104 can receive input 610 for use, manipulation, and/or transformation by download engine 602 to produce one or more useful, concrete, and tangible result, and/or transform one or more articles to different states or things. Further, foreign MNO carrier device 104 can generate and output the useful, concrete, and tangible results and/or the transformed one or more articles produced by download engine 602 as output 612.

Download engine 602, in accordance with one or more embodiments, can detect whether or not a user device (e.g., user equipment device 106) is a member of a local/native evolved packet core network or a member of a foreign/non-native packet core network. Determination of whether or not a user device is a member of a local/native evolved packet core network or a foreign/non-native evolved packet core network can be based on a triggering event, such as whether the user device has transitioned between disparate LAC/TAC defined geographical areas.

Where download engine 602 determines that the user device is a member of a foreign/non-native evolved packet core network, download engine 602 can facilitate determining whether or not there are any pertinent permissive service containers cached to the packet core network associated with foreign MNO carrier device 104. Download engine 602 can also, where it is ascertained that there are no pertinent permissive service containers cached to the packet core network associated with foreign MNO carrier device 104, facilitate a search of the packet core network associated with local MNO carrier device 102. Where download engine 602 determines that the packet core network associated with local MNO carrier device 102 includes extant previously cached permissive service containers, download engine 602 can facilitate transfer of the pertinent permissive service containers from the packet core network associated with local MNO carrier device 102 to the packet core network associated with foreign MNO carrier device 104, and thereafter can initiate and/or facilitate downloading the retrieved permissive service containers to the user device. At has been noted earlier, once the user device has obtained the permissive service container the user device can execute code included in the permissive service container to release functionalities and/or facilities associated with services comprising the shared-use protocol stack as implemented for devices that are native to the packet core associated with local MNO carrier device 102.

Download engine 602, where it is determined that a user device is not associated with the packet core network associated with foreign MNO carrier device 104; that there are no pertinent permissive service containers cached to the packet core network associated with foreign MNO carrier device 104 and that there are no extant pertinent and previously cached permissive service containers in the packet core network associated with local MNO carrier device 102, can facilitate local MNO carrier device 102 to create, generate, and/or distribute/cache the permissive service containers to the packet core network associated with local MNO carrier device 102 and/or the packet core network associated with foreign MNO carrier device 104. Once the permissive service containers have been created, generated, and/or disseminated/cached to the packet core network(s), download engine 602 can facilitate the downloading of the permissive service containers to the user device.

Figure 7:
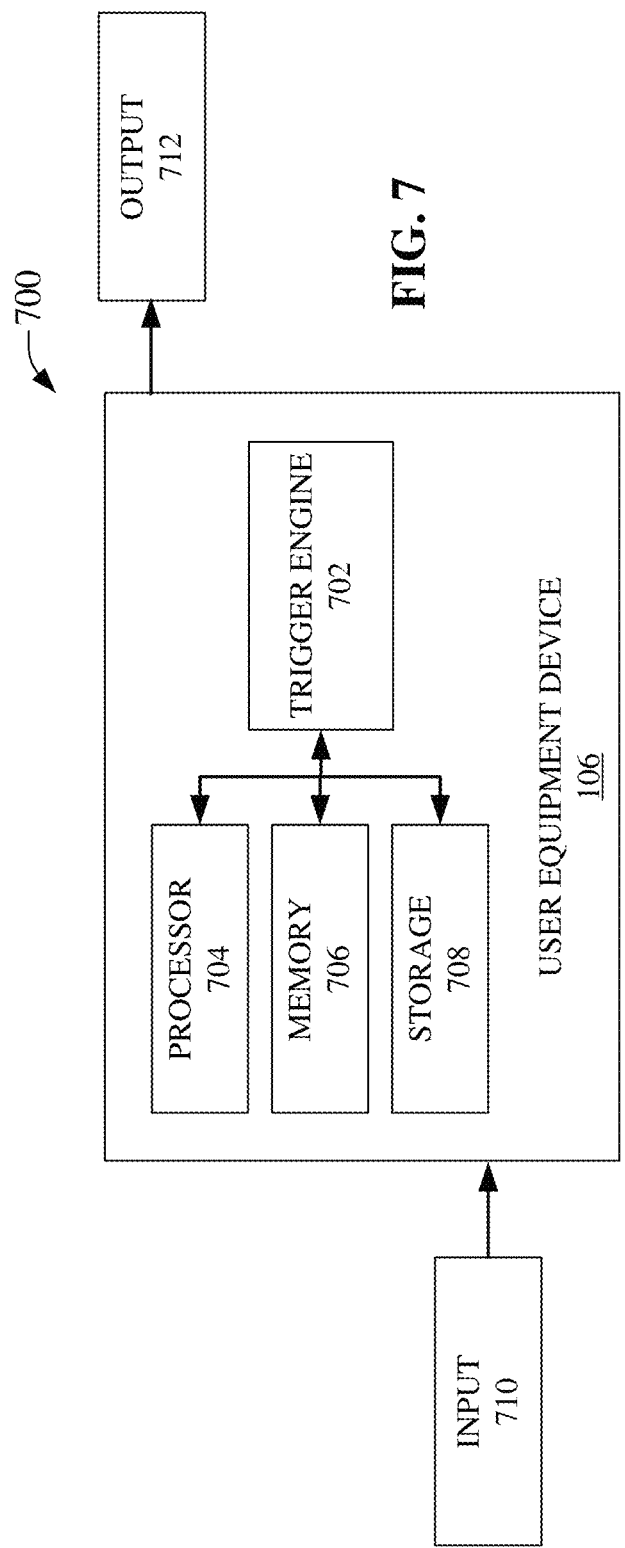
FIG. 7 depicts a another a system that pre-provisions access management containers for wireless services, in accordance with aspects of the subject disclosure.

FIG. 7 illustrates user equipment device 106, now labeled as system 700, for providing pre-provisioned access management containers for wireless services. User equipment device 106 can include trigger engine 702 that can be coupled to processor 704, memory 706, and storage 708. Trigger engine 702 can be in communication with processor 704 for facilitating operation of computer or machine executable instructions and/or components by trigger engine 702, memory 706 for storing data and/or the computer or machine executable instructions and/or components, and storage 708 for providing longer term storage of data and/or machine and/or computer readable instructions. Additionally, user equipment device can receive input 710 for use, manipulation, and/or transformation by trigger engine 702 to produce one or more useful, concrete, and tangible result, and/or transform one or more articles to different states or things. Further, user equipment device 106 can generate and output the useful, concrete, and tangible results and/or the transformed one or more articles produced by trigger engine 702 as output 712.

Trigger component 702 can be used by user equipment device 106 during times of emergency and/or crisis, and/or when user equipment device 106 is not available for reasons such as a declared emergency, when a group of MNOs collaborate to support a large event (e.g., sporting event, musical concert event, . . . ). During such a declared emergency or when MNOs collaborate to support a large event, trigger component 702 can attempt to establish communication with a foreign MNO carrier device (e.g., foreign MNO carrier device 104) in order to obtain one or more services included in the IMS stack. As has been observed earlier, shared-use protocol stack implementations can vary markedly between the packet core networks of the various MNOs. For example, a first packet core network associated with a first MNO can have implemented services A, B, and C from the shared-use protocol stack, whereas a second packet core network associated with a second MNO can have only implemented services A, C, and D. Thus, when user equipment device 106 moves from the first packet core network to the second packet core network, the second packet core network would not be able to support the services (e.g., A, B, and C) the user equipment device 106 would expect to experience in its native operating environment (e.g., the first packet core network). To surmount this issue therefore, when trigger engine 702 determines that user equipment device 106 has crossed into a service coverage area supported by a foreign packet core network it can contact a MNO carrier device (e.g., foreign MNO carrier device 104) to obtain services included in the shared-use protocol stack. In this instance, the MNO carrier device will detect that the request emanating from user equipment device 106 comprising trigger engine 702 is from a user device that is not affiliated with the packet core network for which the MNO carrier device is responsible. The MNO carrier device with thus need to locate from the packet core network (e.g., local packet core network associated with local MNO carrier device 102 and/or foreign packet core network associated with foreign MNO carrier device 104) and thereafter facilitate a download of permissive service containers to the user equipment device. On receiving the permissive service containers, trigger engine 702 can execute the code that can be included in the permissive service containers to provide the functionalities and/or facilities associated with the IMS stack as implemented for devices that are native to the packet core associated with local packet core network (e.g., local packet core network affiliated with local MNO carrier device 102).

Figure 8:
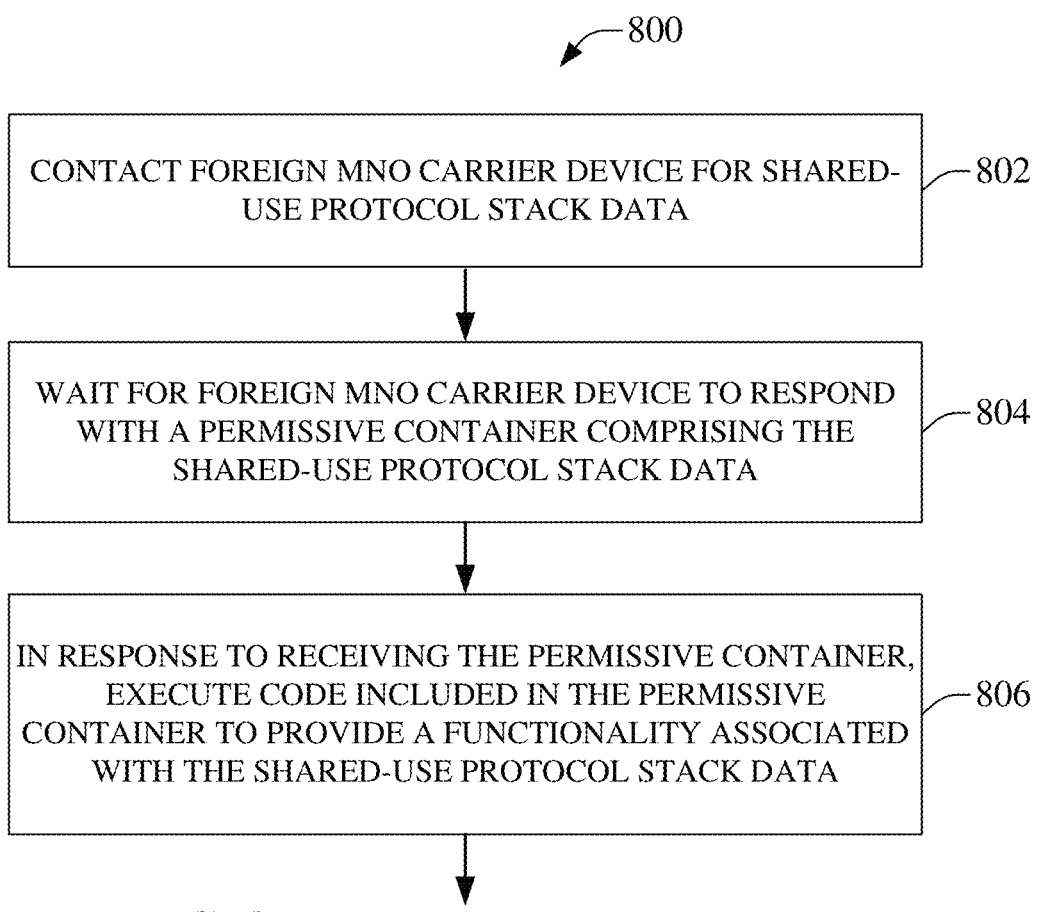
FIG. 8 provides illustration of a flow chart or method for pre-provisioning of access management containers for wireless services, in accordance with aspects of the subject disclosure.

In view of the example system(s) described above, example method(s) that can be implemented in accordance with the disclosed subject matter can be better appreciated with reference to the flowcharts in FIG. 8. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 8 illustrates a method 800 for providing pre-provisioned access management containers for wireless services. Method 800 can commence at act 802 wherein, system 700 (e.g., trigger engine 702), can contact a MNO carrier device (e.g., local MNO carrier device 102 or foreign MNO carrier device 104) for shared-use protocol stack data (e.g., IMS stack data). The shared-use protocol stack data can be data for one or more shared-use protocol stack service such as VoLTE, VOIP, SMS, MMS, streaming audio and/or visual content, emergency alert data, amber alert data, weather warning data, and the like. At 804 trigger device 702 can be placed in a hibernation state until the MNO carrier device locates and downloads a permissive container comprising the requested shared-use protocol stack data to memory 706 and/or storage 708. At 806 trigger engine 702 in response to receiving the permissive container, trigger engine 702 in conjunction with processor 704 can execute code included in the permissive container to provide a facility or functionality associated with the requested shared-use protocol stack data.

It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 9:
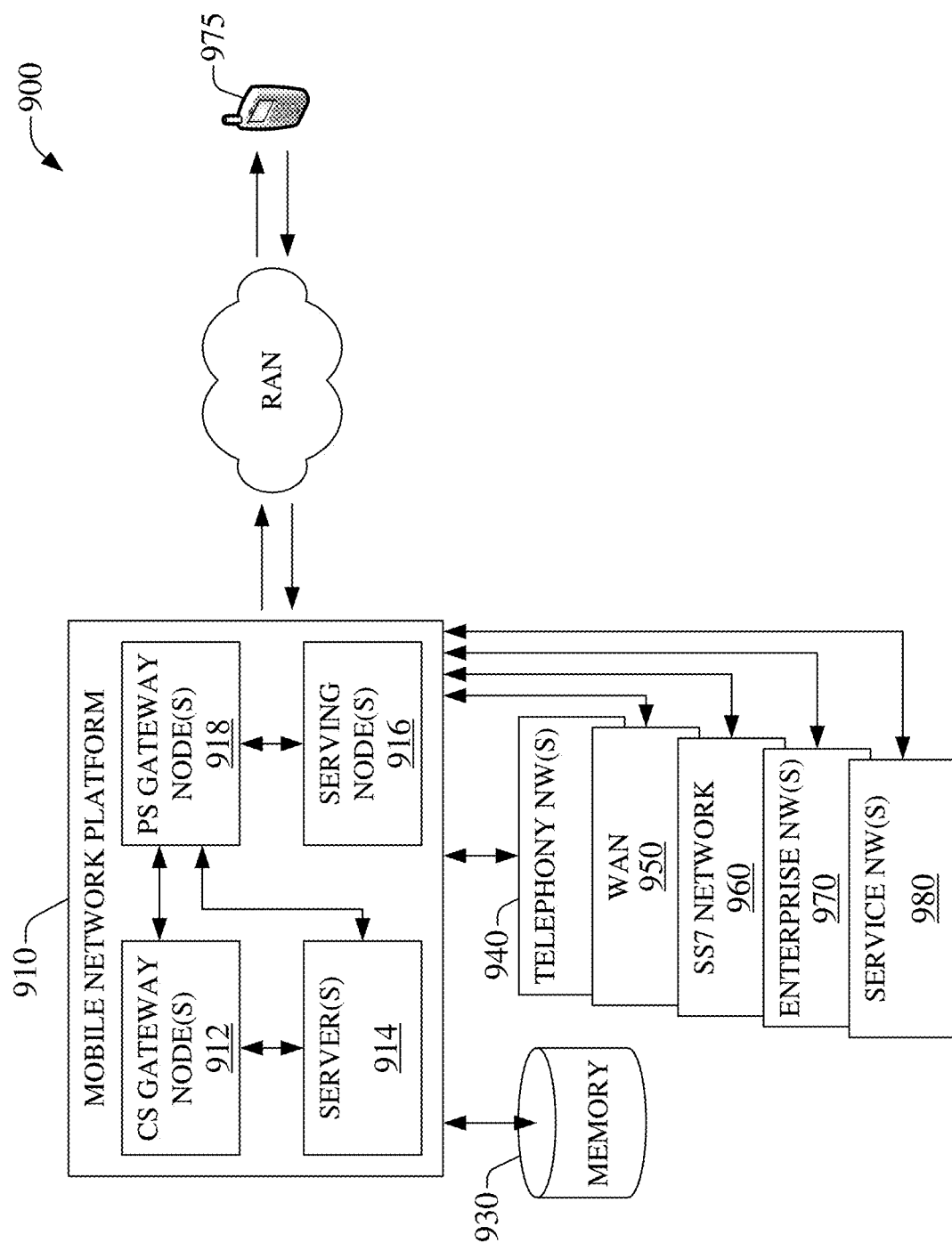
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
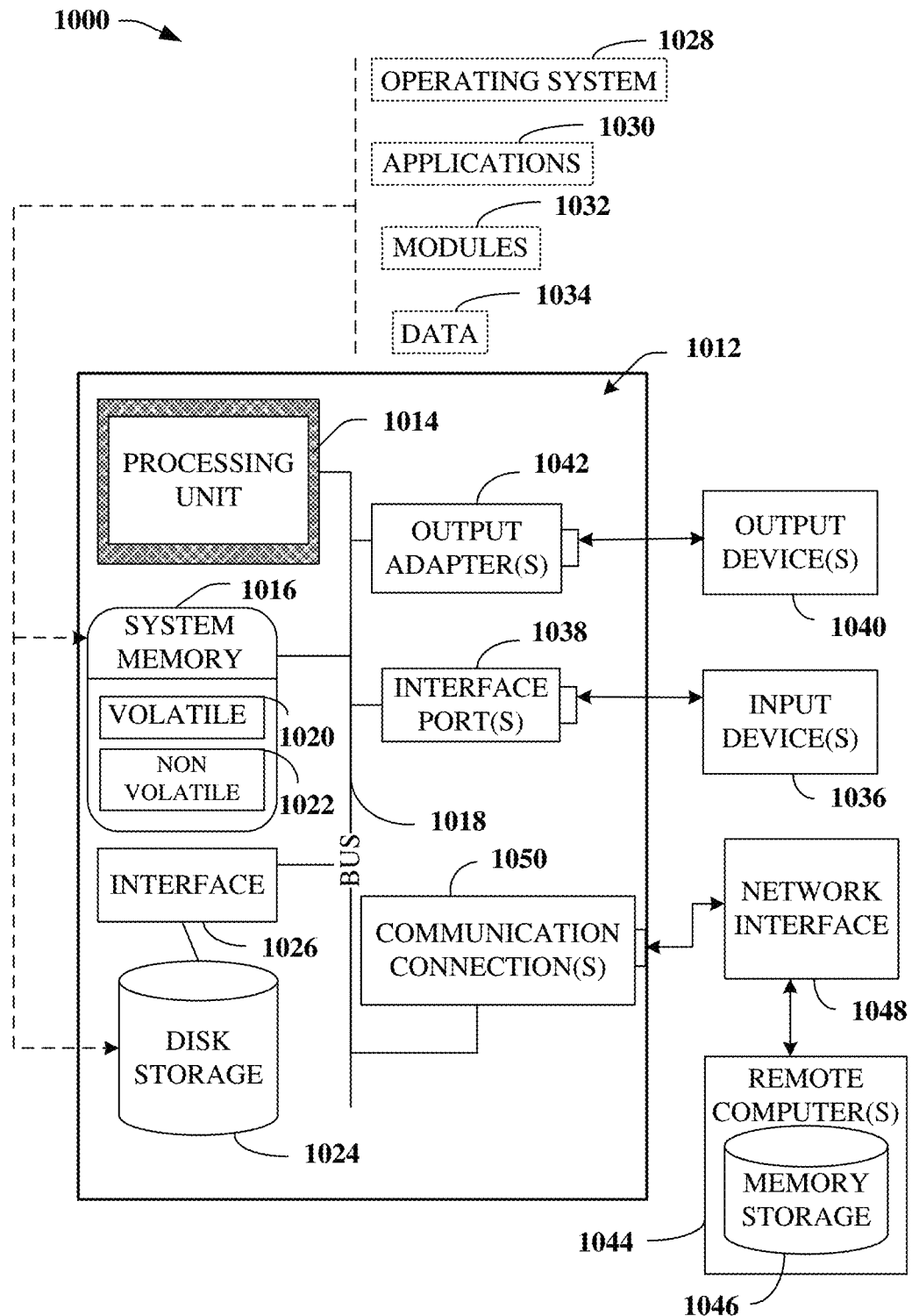
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory"

or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. Network equipment, comprising:
a processor; and
a memory that stores executable instructions that, when executed by the processor, facilitate performance of operations, comprising:
receiving event trigger data comprising a request for a service from a user equipment, wherein the service is determined based on a defined package of services selected in accordance with a reciprocal arrangement between a first mobile network operator entity and a second mobile network operator entity;
initiating a search of first evolved packet core network equipment for permissive service container data based on the request for the service;
retrieving the permissive service container data from the first evolved packet core network equipment, wherein the permissive service container data comprises code associated with the service;
downloading the permissive service container to the user equipment;
determining that the user equipment is operational in a first evolved packet core network; and
based on the user equipment being determined to be in the first evolved packet core network, facilitating execution of the code on the user equipment, wherein the code is a second implementation of the service associated with the second evolved packet core network equipment, and wherein the second implementation of the service associated with the second evolved packet core network equipment differs from a first implementation of the service associated with the first evolved packet core network equipment associated with the first mobile network operator entity.

2. The network equipment of claim 1, wherein the operations further comprise determining, based on the event trigger data, that the user equipment has transitioned from a second evolved packet core network to the first evolved packet core network.

3. The network equipment of claim 1, wherein the service is a shared-use protocol stack service.

4. The network equipment of claim 1, wherein the service is a multimedia messaging service.

5. The network equipment of claim 1, wherein the service is a short messaging service.

6. The network equipment of claim 1, wherein the service is an audio streaming service.

7. The network equipment of claim 1, wherein the service is a streaming of video content associated with an emergency event.

8. The network equipment of claim 1, wherein the permissive service container data is cached to a first group of evolved packet core network equipment.

9. The network equipment of claim 1, wherein the search is a first search, and the operations further comprise initiating, based on the request for the service, a second search of second evolved packet core network equipment.

10. The network equipment of claim 9, wherein the permissive service container data is cached to a second group of evolved packet core network equipment.

11. A method, comprising:
initiating, by equipment comprising a processor, a request for a service from network equipment of a group of network equipment, wherein the service is determined from a group of defined streaming media content for a defined period of time, and wherein the defined streaming media content is governed by a reciprocal agreement between a first mobile network operator entity and a second mobile network operator entity of a group of network operator entities;
facilitating, by the equipment, a search of first evolved packet core network equipment for permissive service container data based on the request for the service;
facilitating, by the equipment, retrieval of the permissive service container data from the first evolved packet core network equipment, wherein the permissive service container data comprises code associated with the service;
determining, by the equipment, that the equipment is part of a first evolved packet core network associated with the first mobile network operator entity; and
based on the equipment being determined to be part of the first evolved packet core network, executing, by the equipment, the code, wherein the code is a second implementation of the service operational on second evolved packet core network equipment associated with the second mobile network operator entity, and wherein the second implementation of the service is operationally different from a first implementation of the service operational on the first evolved packet core network equipment associated with the first mobile network operator entity.

12. The method of claim 11, further comprising initiating, by the equipment, the request for the service based on a transition by the equipment from the first evolved packet core network to a second evolved packet core network.

13. The method of claim 12, wherein the transition from the first evolved packet core network to the second evolved packet core network is determined based on a location area code.

14. The method of claim 12, wherein the transition from the first evolved packet core network to the second evolved packet core network is determined based on a tracking area code.

15. The method of claim 12, wherein the first evolved packet core network is associated with a first unique value generated by the first mobile network operator identity.

16. The method of claim 12, wherein the second evolved packet core network is associated with a second unique value generated by the second mobile network operator identity.

17. A non-transitory machine-readable medium, comprising executable instructions that, when executed by a processor, facilitate performance of operations, comprising:
receiving event trigger data comprising a request for a service from a user equipment, wherein the service is selected from a group of essential services comprising 911 emergency location services, text services, and voice over long term evolution telephonic services for a specified period of time, and wherein the 911 emergency location services are governed by an agreement between a first mobile network operator entity and a second mobile network operator entity;

determining that the user equipment is situated within a broadcast coverage enabled via a first evolved packet core network maintained by the first mobile network operator entity;

initiating a search of first evolved packet core network equipment for permissive service container data based on the request for the service;

retrieving the permissive service container data from the first evolved packet core network equipment, wherein the permissive service container data comprises code associated with the service;

downloading the permissive service container to the user equipment; and based on the user equipment having been determined to be situated within the broadcast coverage enabled via the first evolved packet core network, facilitating execution of the code on the user equipment, wherein the code is a second implementation of the service executable on second evolved packet core network equipment maintained by the second mobile network operator entity, and wherein the second implementation of the service functions differently than a first implementation of the service executable on the first evolved packet core network equipment maintained by the first mobile network operator entity.

18. The non-transitory machine-readable medium of claim 17, wherein the operations further comprise determining, based on the event trigger data, that the user equipment has transitioned from a second evolved packet core network to the first evolved packet core network.

19. The non-transitory machine-readable medium of claim 17, wherein the search is a first search, and the operations further comprise initiating, based on the request for the service, a second search of the second evolved packet core network equipment.

20. The non-transitory machine-readable medium of claim 19, wherein the permissive service container data is cached to a second group of evolved packet core network equipment.

* * * * *